(12) United States Patent
Boutaghou

(10) Patent No.: US 6,507,463 B1
(45) Date of Patent: Jan. 14, 2003

(54) MICRO DISC DRIVE EMPLOYING ARM LEVEL MICROACTUATOR

(75) Inventor: Zine-Eddine Boutaghou, Vadnais Heights, MN (US)

(73) Assignee: Seagate Technology, Inc., Scotts Valley, CA (US)

(*) Notice: Subject to any disclaimer, the term of this patent is extended or adjusted under 35 U.S.C. 154(b) by 0 days.

(21) Appl. No.: 09/460,639

(22) Filed: Dec. 14, 1999

Related U.S. Application Data

(60) Provisional application No. 60/138,696, filed on Jun. 11, 1999.

(51) Int. Cl.$^7$ ............................. G11B 21/24; G11B 5/48

(52) U.S. Cl. ............................. 360/294.3; 360/264.5; 360/246.7

(58) Field of Search ............................. 360/246.7, 264.5, 360/294.1, 294.6, 265.9, 244.2

(56) References Cited

U.S. PATENT DOCUMENTS

| 3,924,268 A | 12/1975 | McIntosh et al. | ............. 360/78 |
| 4,374,402 A | 2/1983 | Blessom et al. | ............. 360/104 |
| 4,651,242 A | 3/1987 | Hirano et al. | ............. 360/103 |

(List continued on next page.)

FOREIGN PATENT DOCUMENTS

| EP | 0 412 221 B1 | 11/1989 |
| JP | 63-122069 | 5/1988 |
| JP | 02-263369 | 4/1989 |
| JP | 04-368676 | 12/1992 |
| JP | 05-094682 | 4/1993 |
| JP | 06-020412 | 1/1994 |
| JP | 07-085621 | 3/1995 |
| JP | 04-134681 | 5/1995 |

OTHER PUBLICATIONS

"Silicon Micromachined Electromagnetic Microactuators for Rigid Disk Drives" by Tang et al, *IEEE Transactions on Magnetics*, vol. 31, No. 6, Nov. 1995.

"Magnetic Recording Head Positioning at Very High Track Densities Using a Microactuator–Based, Two–Stage Servo System" by Fan et al., *IEEE Transactions on Industrial Electronics*, vol. 42, No. 3, Jun. 1995.

"A Flexural Piggyback Milli–Actuator for Over 5 Gbit/in$^2$ Density Magnetic Recording" by Koganezawa et al, *IEEE Transactions on Magnetics*, vol. 32, No. 5, Sep. 1996.

"Transverse Mode Electrostatic Microactuator for MEMS––Based HDD Slider" by Imamura et al, *IEEE* 1996.

"An Experiment for Head Positioning System Using Sub-micron Track–width GMR Head" by Yoshikawa et al., *IEEE Transactions on Magnetics*, vol. 32, No. 5, Sep. 1996.

(List continued on next page.)

*Primary Examiner*—Brian E. Miller
(74) *Attorney, Agent, or Firm*—Kinney & Lange, P.A.

(57) ABSTRACT

A micro disc drive assembly includes a wafer-level actuator arm, a wafer-level suspension connected to the actuator arm, and a head-carrying slider supported by the suspension over a rotatable disc. A microactuator motor is located between the actuator arm and the suspension, and is operable to move the suspension with respect to the actuator arm to position the head-carrying slider adjacent to a selected track of the rotatable disc. By forming the actuator arm and suspension at the wafer level, significant size reductions can be made, and the stiffness of the arm and resonant frequency of the disc drive are increased. A main actuator may also be provided in one embodiment, formed at the wafer level and including coils deposited on a wafer substrate, to coarsely position the actuator arm, suspension and head-carrying slider adjacent to the selected track of the rotatable disc. In another embodiment, a plurality of ganged actuator arms, suspensions and head-carrying sliders may be provided, with independent microactuator motors between each of the actuator arms and suspensions to finely position each of the head-carrying sliders.

23 Claims, 4 Drawing Sheets

U.S. PATENT DOCUMENTS

| | | | | |
|---|---|---|---|---|
| 4,734,805 | A * | 3/1988 | Yamada et al. | 360/104 |
| 4,764,829 | A | 8/1988 | Makino | 360/106 |
| 4,914,725 | A | 4/1990 | Belser et al. | 318/560 |
| 5,021,906 | A | 6/1991 | Chang et al. | 360/103 |
| 5,034,828 | A | 7/1991 | Ananth et al. | 360/75 |
| 5,041,932 | A | 8/1991 | Hamilton | 360/104 |
| 5,153,794 | A * | 10/1992 | Hinlein | 360/244.6 |
| 5,177,652 | A | 1/1993 | Yamaguchi et al. | 360/78.05 |
| 5,189,578 | A | 2/1993 | Mori et al. | 360/106 |
| 5,216,559 | A * | 6/1993 | Springer | 360/106 |
| 5,264,975 | A * | 11/1993 | Bajorek et al. | 360/97.01 |
| 5,303,105 | A | 4/1994 | Jorgenson | 360/106 |
| 5,364,742 | A | 11/1994 | Fan et al. | 430/317 |
| 5,375,033 | A | 12/1994 | MacDonald | 361/281 |
| 5,444,587 | A * | 8/1995 | Johnson et al. | 29/522.1 |
| 5,521,778 | A * | 5/1996 | Boutaghou et al. | 360/106 |
| 5,539,596 | A | 7/1996 | Fontana et al. | 360/106 |
| 5,657,188 | A | 8/1997 | Jurgenson et al. | 360/106 |
| 5,663,854 | A * | 9/1997 | Grill et al. | 360/244.4 |
| 5,711,063 | A | 1/1998 | Budde et al. | 29/603.06 |
| 5,724,211 | A * | 3/1998 | Higashiya et al. | 360/104 |
| 5,745,319 | A | 4/1998 | Takekado et al. | 360/78.05 |
| 5,764,444 | A * | 6/1998 | Imamura et al. | 360/109 |
| 5,768,062 | A * | 6/1998 | Anderson et al. | 360/234.5 |
| 5,771,135 | A * | 6/1998 | Ruiz et al. | 360/244.3 |
| 5,781,381 | A | 7/1998 | Koganezawa et al. | 360/106 |
| 5,793,571 | A * | 8/1998 | Jurgenson et al. | 29/603.25 |
| 5,796,558 | A | 8/1998 | Hanrahan et al. | 360/106 |
| 5,801,472 | A | 9/1998 | Wada et al. | 310/309 |
| 5,802,701 | A * | 9/1998 | Fontana et al. | 29/603.14 |
| 5,805,375 | A | 9/1998 | Fan et al. | 360/78.12 |
| 5,856,896 | A | 1/1999 | Berg et al. | 360/104 |
| 5,862,015 | A | 1/1999 | Evans et al. | 360/104 |
| 5,867,347 | A * | 2/1999 | Knight et al. | 360/104 |
| 5,882,532 | A * | 3/1999 | Field et al. | 216/2 |
| 5,896,246 | A * | 4/1999 | Budde et al. | 360/244.4 |
| 5,898,541 | A | 4/1999 | Boutaghou et al. | 360/109 |
| 5,898,544 | A | 4/1999 | Krinke et al. | 360/104 |
| 5,920,441 | A | 7/1999 | Cunningham et al. | 360/78.05 |
| 5,930,083 | A * | 7/1999 | Adley | 360/244.5 |
| 5,936,805 | A * | 8/1999 | Imaino | 360/104 |
| 5,956,211 | A * | 9/1999 | Adley | 360/244.1 |
| 5,998,906 | A * | 12/1999 | Jerman et al. | 310/309 |
| 6,046,888 | A * | 4/2000 | Krinke et al. | 360/104 |
| 6,049,443 | A * | 4/2000 | Grill et al. | 360/104 |
| 6,069,771 | A * | 5/2000 | Boutaghou et al. | 360/294.4 |
| 6,108,175 | A * | 8/2000 | Hawwa et al. | 360/294.4 |
| 6,115,223 | A * | 9/2000 | Berg et al. | 360/294.4 |
| 6,134,207 | A * | 10/2000 | Jerman et al. | 369/112 |
| 6,157,522 | A * | 12/2000 | Murphy et al. | 360/294.6 |
| 6,178,069 | B1 * | 1/2001 | Suzuki | 360/294.5 |
| 6,188,548 | B1 * | 2/2001 | Khan et al. | 360/294.4 |
| 6,198,606 | B1 * | 3/2001 | Boutaghou et al. | 360/294.3 |
| 6,222,706 | B1 * | 4/2001 | Stefansky et al. | 366/294.5 |
| 6,233,124 | B1 * | 5/2001 | Budde et al. | 360/294.4 |
| 6,239,953 | B1 * | 5/2001 | Mei | 360/294.6 |
| 6,249,064 | B1 * | 6/2001 | Bradbury | 310/22 |

OTHER PUBLICATIONS

"Micro Electrostatic Actuators in Dual–Stage Disk Drives with High Track Density" by Tang et al., *IEEE Transactions on Magnetics*, vol. 32, No. 5, Sep. 1996.

"Piezoelectric Microactuator Compensating for Off–Track Errors in Magnetic Disk Drives" by Imamura et al, *Advance Information Storage Systems*, vol. 5, pp. 119–125.

"A Dual–Stage Magnetic Disk Drive Actuator Using a Piezoelectric Device for a High Track Density" by Mori et al., *IEEE Transactions on Magnetics*, vol. 27, No. 6, Nov. 1991.

"Dynamic Loading Criteria for 3–1/2 Inch Inline HDD Using Multilayer Piezoelectric Load/Unload Mechanism" by Kajitani et al., *IEEE Transactions on Magnetics*, vol. 27, No. 6, Nov. 1991.

"Design, Fabrication, and Testing of Silicon Microgimbals for Super–Compact Rigid Disk Drives" by Temesvary et al., *Journal of Microelectromechanical Systems*, vol. 4, No. 1, Mar. 1995.

"VLSI–NEMS Chip for AFM Data Storage" by M. Despont et al., IBM Research Division, Zurich Research Laboratory, Switzerland.

* cited by examiner

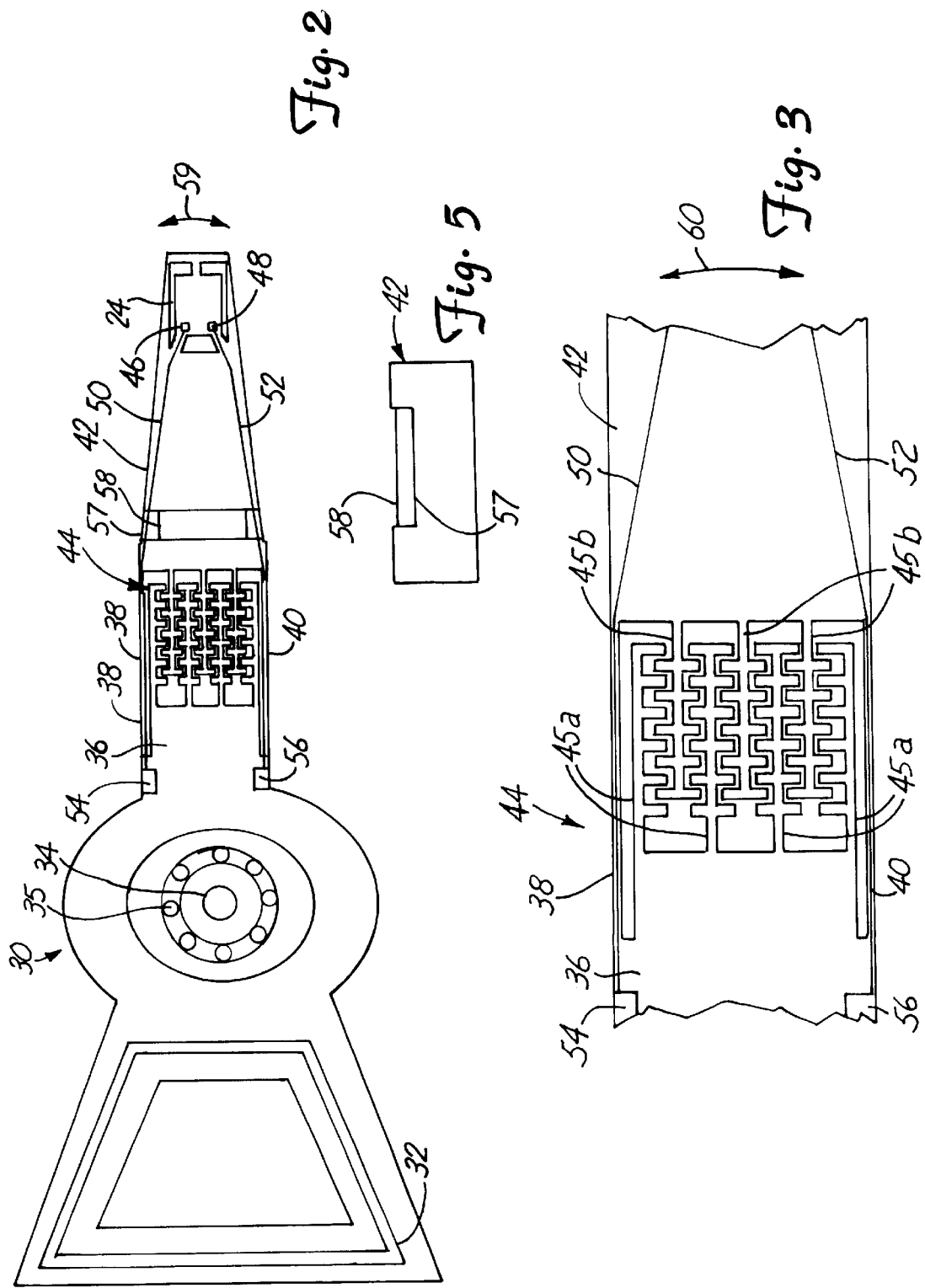

US 6,507,463 B1

MICRO DISC DRIVE EMPLOYING ARM LEVEL MICROACTUATOR

CROSS-REFERENCE TO RELATED APPLICATION(S)

This application claims priority from Provisional Application No. 60/138,696 filed Jun. 11, 1999 for "Electro-Static Arm Level Micro-Actuator For Milli and Micro Disk Drives" by Z. Boutaghou.

BACKGROUND OF THE INVENTION

The present invention relates to a micro disc drive employing an arm level microactuator to enable reduction in the size of the disc drive and disc media and increased recording density on the disc media.

In order to increase the density of concentric data tracks on magnetic and polymeric recording discs, more precise radial positioning of the transducing head is required. Conventional disc drives, which are typically composed of stainless steel, accomplish head positioning by operating an actuator arm with a large-scale actuation motor, such as a voice coil motor, to radially position a head on a flexure at the end of the actuator arm. The large-scale motor lacks sufficient resolution to effectively accommodate high track-density discs. Thus, a high resolution head positioning mechanism, or microactuator, is necessary to accommodate the more densely spaced tracks.

One promising approach for high resolution head positioning involves employing a high resolution microactuator in addition to the conventional lower resolution actuator motor, thereby effecting head positioning through dualstage actuation. Various microactuator designs have been considered to accomplish high resolution head positioning. These designs nearly universally involve the addition of a microactuator structure to a conventional disc drive assembly, so that traditional disc drive parts and disc media may continue to be used in the disc drive assembly. There are substantial technical challenges involved in implementing such microactuator designs to provide sufficiently large actuation forces, sufficiently stable and repeatable motions, and sufficiently high resolution to accommodate the high track densities that are desired. Many of these designs utilize some sort of piezoelectric device to cause an elastic deformation of a moving portion of the microactuator and thereby move the transducing head across tracks of the disc. While these solutions are effective to accommodate higher track densities in conventional disc drive systems, the extent of track density increase is limited by manufacturing tolerances, forming processes, piezoelectric material variations, and mechanical vibrations due to wire connections to the head or the flex circuit utilized by the disc drive. In addition, because these designs utilize conventional disc drive components, no meaningful size reduction in the disc drive can be achieved, despite the potential for such a reduction due to the high track densities recorded on the disc media that would make a reduction in the size of the disc media possible.

There is a need in the art for a miniaturized disc drive system. capable of accommodating extremely high track densities with sufficient actuation force and resolution, utilizing an assembly that is simple and inexpensive to manufacture.

BRIEF SUMMARY OF THE INVENTION

The present invention is a micro disc drive assembly including a wafer-level actuator arm, a wafer-level suspension, and a head-carrying slider supported by the suspension over a rotatable disc. A microactuator motor is located between the actuator arm and the suspension, and is operable to move the suspension with respect to the actuator arm to position the head-carrying slider adjacent to a selected track of the rotatable disc. By forming the actuator arm and suspension at the wafer level, significant size reductions can be made, such that in an exemplary embodiment the actuator arm is no longer than about 10 millimeters. The reduced length of the actuator arm increases the stiffness of the arm and therefore increases the resonant frequency of the disc drive for seek operations. A main actuator may also be provided in one embodiment, also formed at the wafer level and including coils deposited on a wafer substrate, to coarsely position the actuator arm, suspension and head-carrying slider adjacent to the selected track of the rotatable disc. In another embodiment, a plurality of ganged actuator arms, suspensions and head-carrying sliders may be provided, with independent microactuator motors between each of the actuator arms and suspensions to finely position each of the head-carrying sliders.

BRIEF DESCRIPTION OF THE DRAWINGS

FIG. 2 is a top view of a micro disc drive according to the present invention.

FIG. 3 is an enlarged view of a translational electrostatic microactuator for use with the micro disc drive of the present invention.

FIG. 5 is an enlarged view of a stress-inducing coating for use in the suspension of the micro disc drive of the present invention.

DETAILED DESCRIPTION

Figure 1:
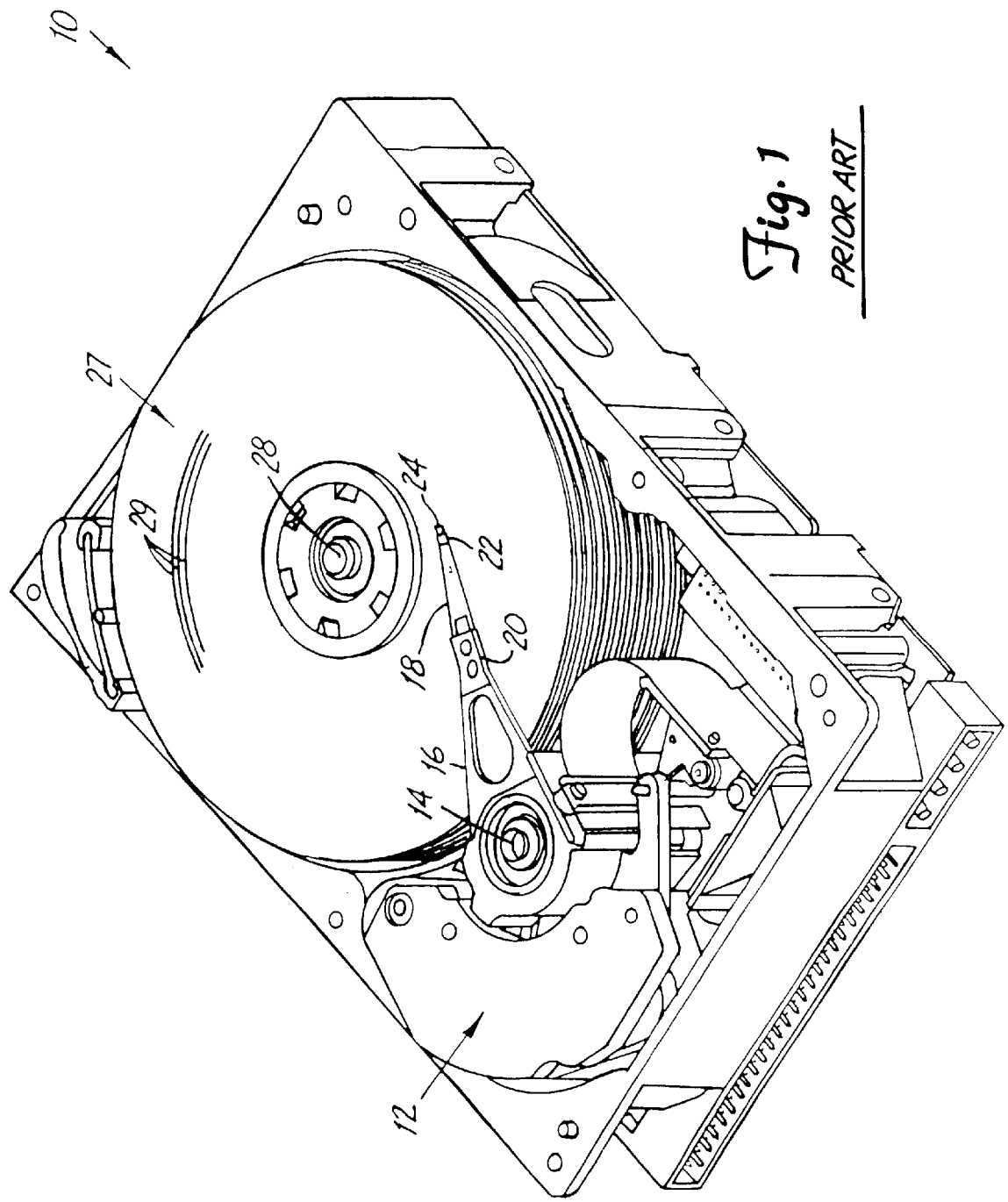
FIG. 1 is a perspective view of a prior art disc drive actuation system for positioning a slider over tracks of a disc.

FIG. 1 is a perspective view of a prior art disc drive actuation system 10 for positioning slider 24 over a track 29 of disc 27. Actuation system 10 includes voice coil motor (VCM) 12 arranged to rotate actuator arm 16 on a spindle around axis 14. Head suspension 18 is connected to actuator arm 16 at head mounting block 20. Flexure 22 is connected to an end of head suspension 18, and carries slider 24. Slider 24 carries a transducing head (not shown in FIG. 1) for reading and/or writing data on concentric tracks of disc 27. Disc 27 rotates around axis 28, so that windage is encountered by slider 24 to keep it aloft a small distance above the surface of disc 27.

VCM 12 is selectively operated to move actuator arm 16 around axis 14, thereby moving slider 24 between tracks 29 of disc 27. However, for disc drive systems with high track density, VCM 12 lacks sufficient resolution and frequency response to position a transducing head on slider 24 precisely over a selected track 29 of disc 27. Therefore, in order to accommodate densely spaced tracks, a higher resolution actuation device of some kind is necessary.

FIG. 2 is a top view of micro disc drive 30 according to the present invention. Micro disc drive 30 includes voice coil motor (VCM) 32 arranged to rotate actuator arm 36 on ball bonded joint 35 around axis 34. Actuator arm 36 is connected to head suspension 42 by flexible beams 38 and 40, and also by the interdigitated combs of electrostatic microactuator motor 44. Head suspension 42 carries integral gimbal 46 to support slider 24 over the surface of a rotatable disc. Operation of VCM 32 and of electrostatic microactuator motor 44 cause movement of slider 24 in the direction of arrows 59.

Figure 4:
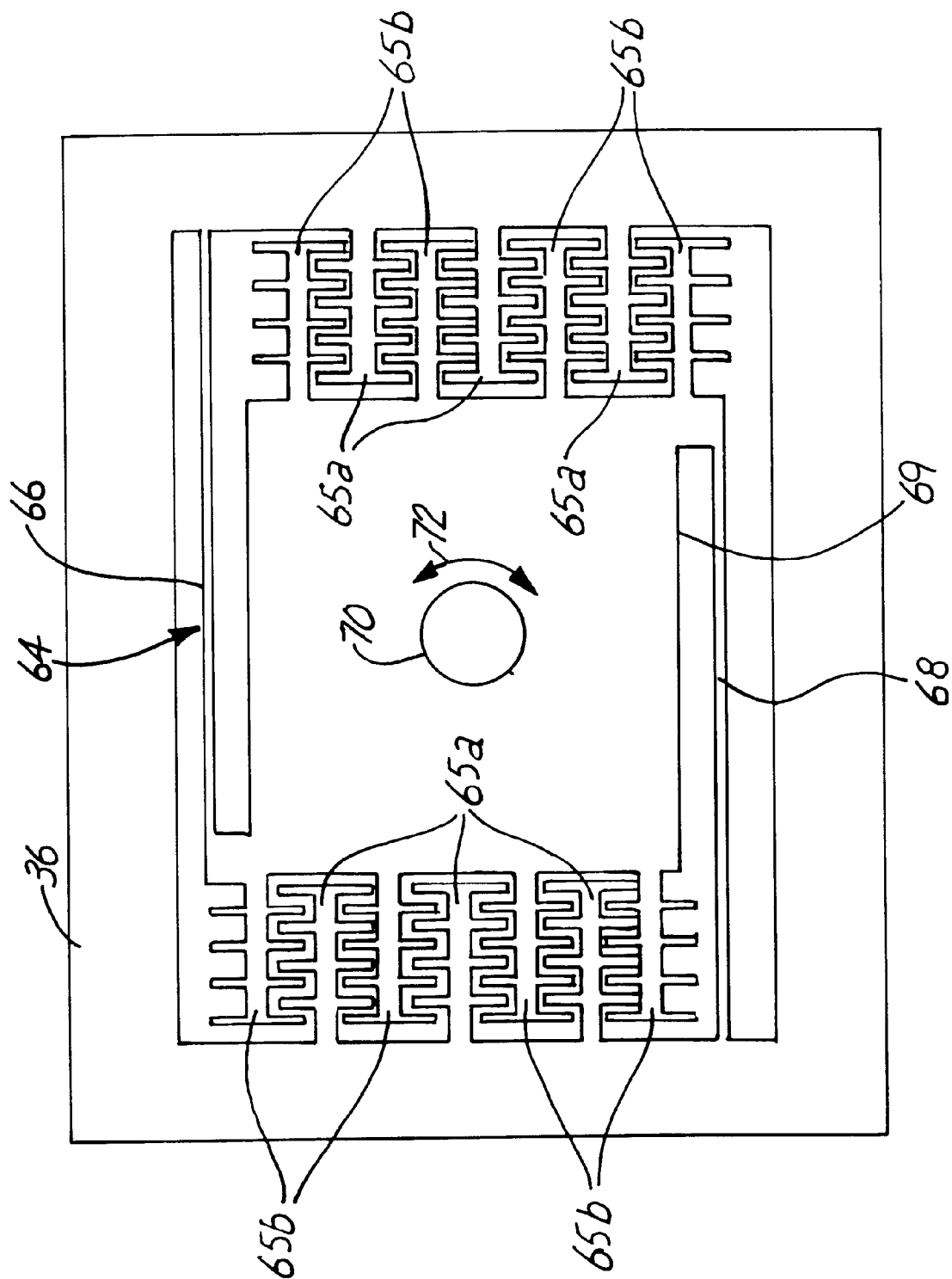
FIG. 4 is an enlarged view of a rotational electrostatic microactuator for use with the micro disc drive of the present invention.

VCM 32, actuator arm 36, head suspension 42 and connecting beams 38 and 40 are all composed of silicon or a comparable ceramic substrate material compatible with high resolution wafer processing techniques, with features formed by a high resolution process such as Deep Trench Reactive Ion Etching (DTRIE) or the like. Features and components formed with a wafer processing technique from a ceramic substrate material are often referred to in the art as a "wafer-level" component. The coils of VCM 32 may be deposited on the substrate in a conventional manner known in the art, and ball bond joint 35 provides axis 34 about which actuator arm 36 is rotated as a rigid body upon operation of VCM 32. Actuator arm 36 and head suspension 42 are each formed with interdigitated combs to create electrostatic microactuator motor 44 for finely positioning slider 24 over a selected track of a rotating disc. More details regarding the construction of two embodiments of electrostatic microactuator motor 44 are shown in FIGS. 3 and 4.

Because of the processing resolution of forming the actuator arm and suspension structures of a ceramic material such as silicon rather than stainless steel or other conventional materials, actuator arm 36 of micro disc drive 30 may be formed with a total length of approximately 1–10 millimeters, compared to conventional disc drives with a length of about 20–80 millimeters. As a result of its shorter overall length, actuator arm 36 and head suspension 42 of micro disc drive 30 exhibits superior stiffness characteristics relative to the force applied to move actuator arm 36 and head suspension 42 across the tracks of the disc, thereby increasing the resonant frequency of the actuation system. In addition, by building electrostatic microactuator motor 44 into the structure of actuator arm 36 and suspension 42 to occupy nearly the entire width of those structures, the confronting areas of the interdigitated combs and/or the number of interdigitated combs with respect to the size of the microactuation structure are maximized, and since the area and number of the comb gaps is directly proportional to the microactuation force generated, the microactuation force generated by motor 44 is maximized as well.

Conductive bond pads 46 and 48 are provided for electrical connection to the transducing head carried by slider 24, and are connected by conductive traces 50 and 52 along suspension 42 and beams 38 and 40 to bondpads 54 and 56 formed on actuator arm 36. The formation of bond pads 46, 48, 54 and 56 and conductive traces 50 and 52 is achieved in a manner known in the art, since: actuator arm 36, beams 38 and 40 and suspension 42 are composed of a silicon substrate material. Wires to an appropriate preamplifier are connected to bond pads 54 and 56 on actuator arm 36, which is part of the stationary portion of the microactuator and therefore does not introduce any bias forces to the motion of the microactuator. The bias forces associated with contacting the transducing head have served to limit the effectiveness of previous microactuator designs, so it is significant that such forces are eliminated by the microactuator construction and configuration of the present invention.

FIG. 3 is an enlarged view of translational electrostatic microactuator motor 44 for use with the micro disc drive of the present invention. Microactuator motor 44 includes interdigitated combs 45a extending from actuator arm 36 and combs 45b extending from head suspension 42 to form an electrostatic motor, with actuator arm 36 and head suspension 42 also being connected by flexible beams 38 and 40. In operation, application of a differential voltage to the silicon structures of opposing combs 45a and 45b causes the dimensions of the gaps between combs 45a and 45b to change. Specifically, as is known in the art of electrostatic motor design, it is possible to generate an attractive force between adjacent combs by applying a differential voltage between the combs. As a result, beams 38 and 40 are forced to bend, which causes suspension 42 to move with respect to actuator arm 26 in the direction indicated by arrows 60.

FIG. 4 is an enlarged view of alternative rotational electrostatic microactuator motor 64 for use with the micro disc drive of the present invention. Microactuator motor 64 is formed in an interior aperture of actuator arm 36, with interdigitated combs 65a extending from the actuator arm on each side of the aperture and combs 65b extending from central microactuator rotor 69 located in the aperture. Actuator arm 36 and microactuator rotor 69 are also connected by flexible beams, 66 and 68. Microactuator rotor 69 is then attached to head suspension 42 (FIG. 2) at locating aperture 70 so that movement of rotor 69 effects corresponding movement of suspension 42 and the head-carrying slider supported thereby. In operation, application of a differential voltage to the silicon structures of opposing combs 65a and 65b causes the dimensions of the gaps between combs 65a and 65b to change. Specifically, as is known in the art of electrostatic motor design, it is possible to generate an attractive force between adjacent combs by applying a differential voltage between the combs. As a result, beams 66 and 68 are forced to bend, which causes microactuator rotor 69 (and the attached head suspension) to rotate around location aperture 70 in the direction indicated by arrows 72. Rotational microactuator motor 64 is preferably implemented with opposing combs on one side of the motor arranged in a particular manner and opposing combs on the other side of the motor arranged in the opposite manner, so that attractive forces between adjacent combs on the first side of microactuator motor 64 rotate microactuator rotor 69 in a first direction when a first differential voltage is applied, and attractive forces on the second, opposite side of microactuator motor 64 rotate microactuator rotor 69 in a second, opposite direction when a second, opposite differential voltage is applied.

FIG. 5 is an enlarged side view of a portion of head suspension 42 including stress-inducing coating 58 formed in trench 57 of head suspension 42 to apply pre-load force for biasing head suspension 42 toward the surface of the rotating disc, thereby maintaining the head-carrying slider proximate to the surface of the disc during operation of the disc drive. Stress-inducing coating 58 may be composed of any of a number of materials having appropriate characteristics to cause suspension 42 to be biased downward toward the disc due to the expansion properties of the coating material. One example of such a material is alumina. By implementing stress-inducing coating 58 in this manner, there is no need for a mechanical application of pre-load force, which simplifies the construction of the disc drive of the present invention.

Figure 6:
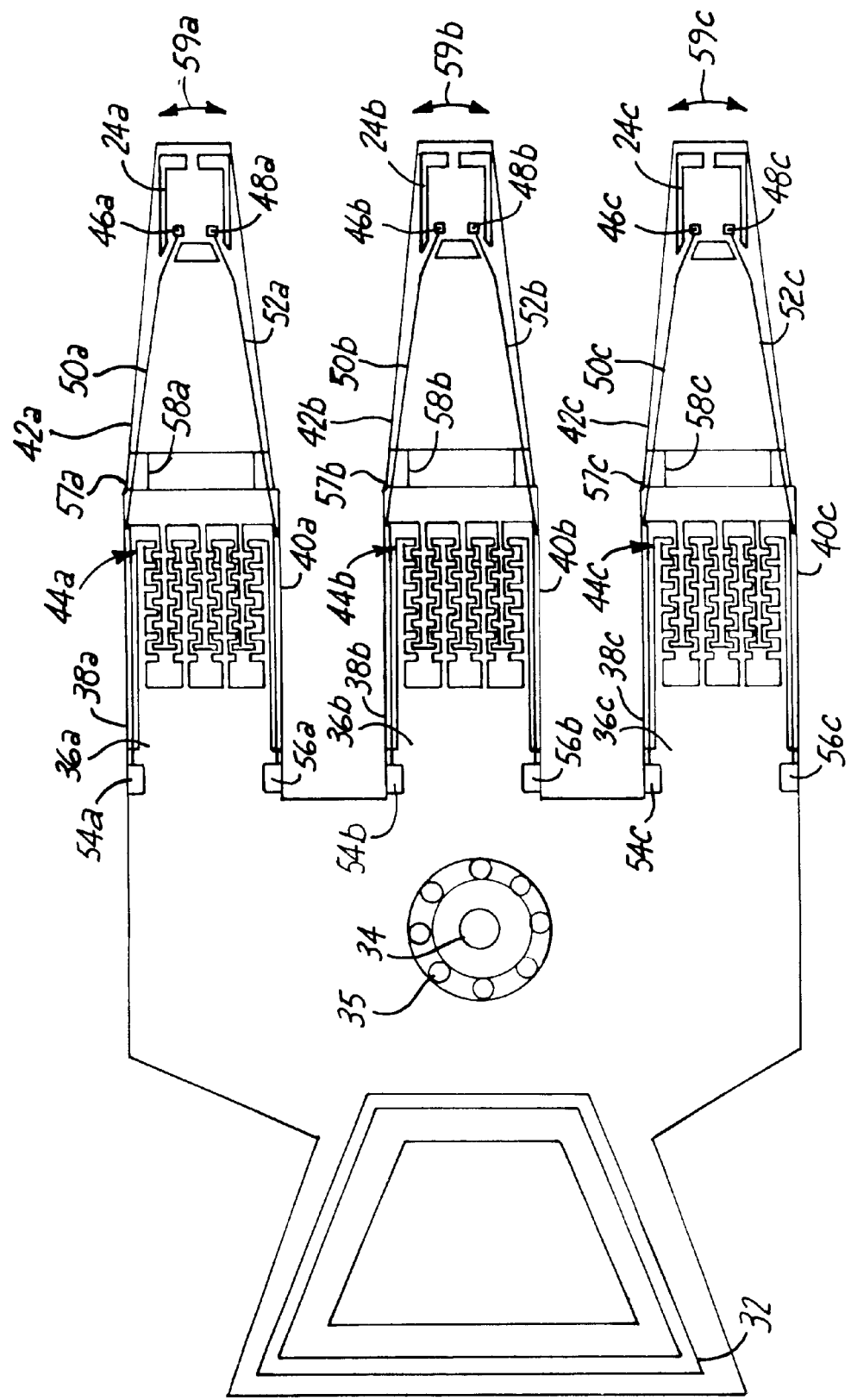
FIG. 6 is a top view of a micro disc drive utilizing multiple ganged microactuators according to an alternate embodiment of the present invention.

FIG. 6 is a top view of micro disc drive 80 utilizing ganged microactuators according to an alternate embodiment of the present invention. Micro disc drive 80 includes voice coil motor (VCM) 32 arranged to rotate actuator arms 36a, 36b and 36c on ball bonded joint 35 around axis 34. Actuator arms 36a, 36b and 36c are connected to respective head suspensions 42a, 42b and 42c by flexible beams 38a, 38b and 38c and 40a, 40b and 40c, and also by the interdigitated combs of respective electrostatic microactuator motors 44a, 44b and 44c. Head suspensions 42a, 42b and 42c carry integral gimbals 46a, 46b and 46c to support sliders 24a, 24b and 24c over the surface of a rotatable disc. Operation of electrostatic microactuator motors 44a, 44b and 44c cause movement of respective sliders 24a, 24b and 24c in the direction of arrows 59a, 59b and 59c.

VCM 32, actuator arms 36a, 36b and 36c, head suspensions 42a, 42b and 42c and connecting beams 38a, 38b and 38c and 40a, 40b and 40c are all composed of silicon or a comparable ceramic substrate material compatible with high resolution wafer processing techniques, as described above with respect to FIG. 2. By utilizing multiple ganged actuator arms having independent microactuator motors for finely positioning a selected head, the overall range of tracks that can be covered for a particular position of VCM 32 is increased substantially, which allows for high track densities to be realized on the surface of the disc. Because of the extremely small size of actuator arms 36a, 36b and 36c and the other silicon components of micro disc drive 80, multiple actuator arms 36a, 36b and 36c may be coarsely positioned by single VCM 32 with sufficient frequency and bandwidth to perform an effective seek operation, with microactuator motors 44a, 44b and 44c achieving fine positioning of the selected head in a dual-stage actuation scheme. In an alternate embodiment, the number of actuator arms may be increased to such an extent that the main actuator may be eliminated, with the full extent of the disc (with the possible exception of some "dead zones" between adjacent actuator arms) being covered by selecting an appropriate head supported by one of the multiple actuator arms and positioning the head with the microactuator motor attached to the actuator arm.

The present invention provides a significant reduction in the size of a disc drive, without sacrificing data storage capacity, by implementing all of the disc drive components in a wafer level construction of a substrate material such as silicon. High resolution positioning of the transducing head of the disc drive is achieved by a microactuator motor integrated into the actuator arm and head suspension of the disc drive, also at the wafer level for simple manufacturability. For particularly small embodiments, up to 30 disc drive assemblies may be formed from a single wafer. In addition, the main actuator coils may also be realized at the wafer level to further reduce the total size of the disc drive. The microactuator motor maybe of an electrostatic type utilizing interdigitated combs, or alternatively may involve parallel plates or any other small-scale motor design known in the art and realizable at the wafer processing level with sufficiently high resolution to implement the microactuator motor with the miniaturized actuator arm and head suspension structure of the present invention. The construction of the microactuator motor to occupy nearly the entire width of the actuator arm yields high microactuator force for the relative size of the disc drive, since the number and size of gaps between combs or plates of the microactuator are high with respect to the size of the actuator arm. Also, the reduced length of the actuator arm and suspension compared to prior disc drive designs increases the stiffness of the drive and therefore increases the frequency and bandwidth that can be achieved during seek operations by the drive. Electrical connections to the transducing head are accomplished by depositing conductive traces along the head suspension and the microactuator beams connecting the head suspension to the actuator arm, so that no additional bias forces are introduced by the connection to the head. The micro disc drive of the present invention therefore is able to reduce the size of the disc drive from the order of centimeters to the order of millimeters while accommodating densely spaced tracks so that the disc drive has high data storage capacity as well. As a result, the micro disc drive of the present invention offers a significant decrease in cost and manufacturing complexity for comparable data storage capacities.

Although the present invention has been described with reference to preferred embodiments, workers skilled in the art will recognize that changes may be made in form and detail without departing from the spirit and scope of the invention.

What is claimed is:

1. A micro disc drive assembly comprising:
    an actuator arm;
    a suspension connected to the actuator arm;
    a head-carrying slider supported by the suspension over a rotatable disc; and
    a microactuator motor composed at least in part of a ceramic substrate material compatible with high resolution wafer processing techniques and positioned between the actuator arm and the suspension, the microactuator motor being an electrostatic motor operable to move the suspension with respect to the actuator arm to position the head-carrying slider adjacent to a selected track of the rotatable disc, and including a first set of combs extending from the actuator arm and a second set of combs extending from the suspension, the first set of combs being interdigitated with the second set of combs.

2. The micro disc drive assembly of claim 2, wherein the microactuator motor has a width substantially equal to a width of the actuator arm.

3. The micro disc drive assembly of claim 1, wherein the first set of combs extend from the actuator arm into an internal aperture of the actuator arm and the second sent of combs extend from a microactuator rotor attached to the suspension.

4. The micro disc drive assembly of claim 1, wherein the suspension includes a stress-inducing coating to bias the suspension toward the rotatable disc.

5. The micro disc drive assembly of claim 1, wherein the suspension and the actuator arm are connected by a plurality of flexible beams.

6. The micro disc drive assembly of claim 5, further including at least one conductive trace extending along the suspension, the flexible beams and the actuator arm for electrical connection to the head-carrying slider.

7. The micro disc drive assembly of claim 1, further comprising a main actuator motor attached to the actuator arm, the main actuator motor including coils and being operable to coarsely position the actuator arm, suspension and head-carrying slider adjacent to the selected track of the rotatable disc.

8. The micro disc drive assembly of claim 1, wherein the actuator arm has a length of no greater than about 10 millimeters.

9. A micro disc drive assembly comprising:
    a plurality of actuator arms each composed of silicon;
    a plurality of suspensions, each of the plurality of suspensions being connected to a respective one of the plurality of actuator arms and being composed of silicon;
    a plurality of head-carrying sliders, each of the plurality of head-carrying sliders being supported by a respective one of the plurality of suspensions over a rotatable disc; and a plurality of independent microactuator motors, each of the plurality of independent microactuator motors being located between a respective actuator arm and a respective suspension and being electrostatic motors operable to move the respective suspension with respect to the respective actuator arm to position a respective head-carrying slider adjacent to a selected track of the rotatable disc, and including a first set of combs extending from the respective actuator arm and a second set of combs extending from the respective suspension, the first set of combs being interdigitated with the second set of combs.

10. The micro disc drive assembly of claim 9, further comprising a main actuator motor attached to the plurality of actuator arms, the main actuator motor being composed of silicon, including coils deposited on the silicon and being operable to coarsely position the actuator arms, suspensions and head-carrying sliders adjacent to the selected track of the rotatable disc.

11. The micro disc drive assembly of claim 9, wherein each of the plurality of microactuator motors has a width substantially equal to a width of the respective actuator arm.

12. The micro disc drive assembly of claim 9, wherein the first set of combs extends from the respective actuator arm into an internal aperture of the respective actuator arm and the second sent of combs extends from a respective one of a plurality of microactuator rotors attached to the respective suspension.

13. The micro disc drive assembly of claim 9, wherein each of the plurality of suspensions includes a stress-inducing coating to bias the suspension toward the rotatable disc.

14. The micro disc drive assembly of claim 9, wherein each respective suspension and actuator arm are connected by a plurality of flexible beams.

15. The micro disc drive assembly of claim 14, further including at least one conductive trace extending along each respective suspension, flexible beams and actuator arm for electrical connection to the respective head-carrying slider.

16. A micro disc drive assembly comprising:
   an actuator arm composed of silicon;
   a suspension connected to the actuator arm, the suspension being composed of silicon;
   a head-carrying slider supported by the suspension over a rotatable disc; and
   a microactuator motor composed at least in part of a ceramic substrate material compatible with high resolution wafer processing techniques and positioned between the actuator arm and the slider, the microactuator motor being an electrostatic motor operable to position the head-carrying slider adjacent to a selected track of the rotatable disc, and including a first set of combs extending from the actuator arm and a second set of combs extending from the suspension, the first set of combs being interdigitated with the second set of combs.

17. The micro disc drive assembly of claim 16, wherein the microactuator motor has a width substantially equal to a width of the actuator arm.

18. The micro disc drive assembly of claim 16, wherein the first set of combs extends from the actuator arm into an internal aperture of the actuator arm and the second sent of combs extends from a microactuator rotor attached to the suspension.

19. The micro disc drive assembly of claim 16, wherein the suspension includes a stress-inducing coating to bias the suspension toward the rotatable disc.

20. The micro disc drive assembly of claim 16, wherein the suspension and the actuator arm are connected by a plurality of flexible beams.

21. The micro disc drive assembly of claim 20, further including at least one conductive trace extending along the suspension, the flexible beams and the actuator arm for electrical connection to the head-carrying slider.

22. The micro disc drive assembly of claim 16, further comprising a main actuator motor attached to the actuator arm, the main actuator motor being composed of silicon, including coils deposited on the silicon and being operable to coarsely position the actuator arm, suspension and head-carrying slider adjacent to the selected track of the rotatable disc.

23. The micro disc drive assembly of claim 16, wherein the actuator arm has a length of no greater than about 10 millimeters.

* * * * *